July 13, 1943.    O. J. POUBITCH    2,324,268
FASTENING DEVICE
Filed Jan. 30, 1942
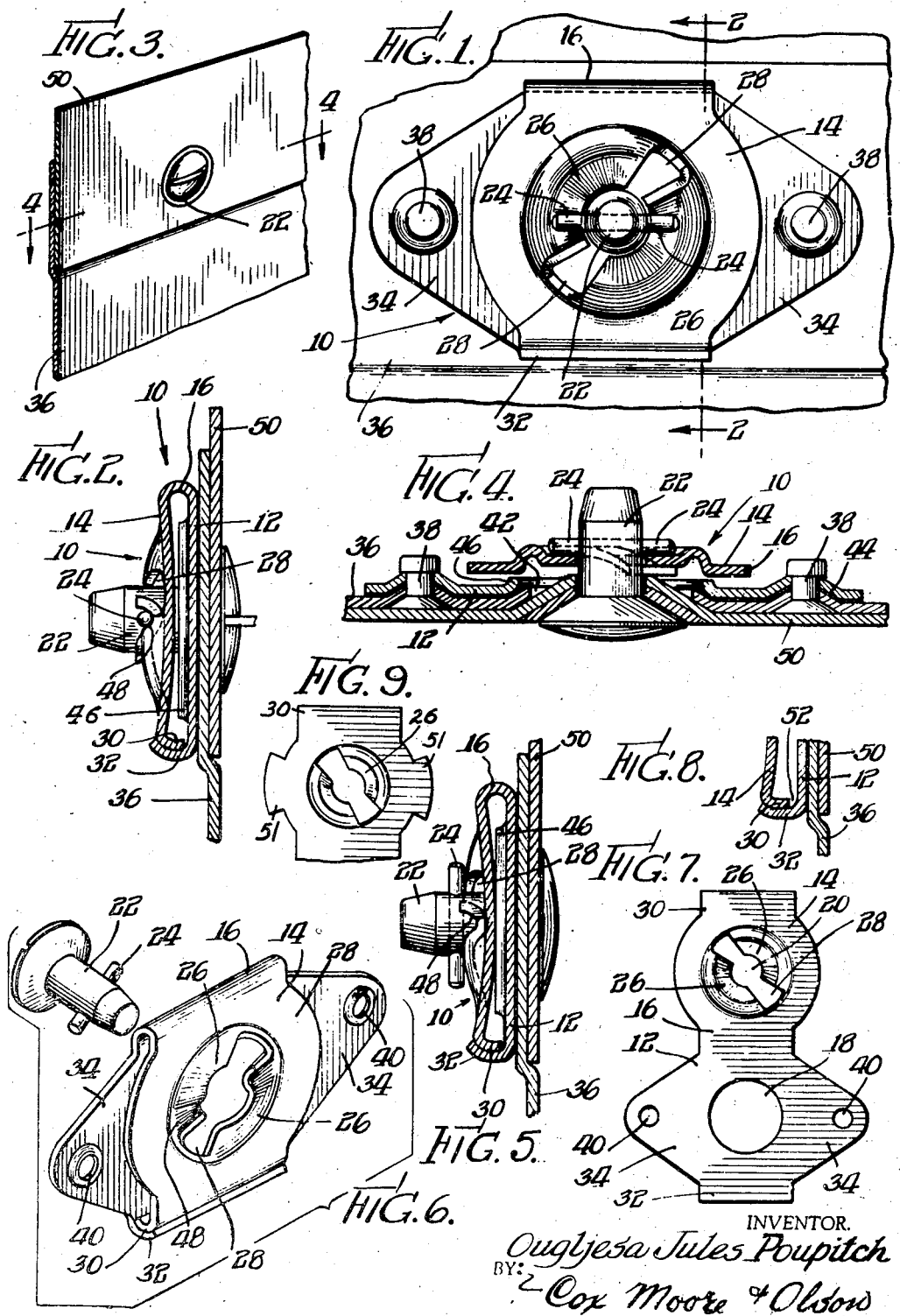
INVENTOR.
Ougljesa Jules Poupitch
BY: Cox Moore & Olson
attys.

Patented July 13, 1943

2,324,268

UNITED STATES PATENT OFFICE 2,324,268

FASTENING DEVICE

Ougljesa Jules Poupitch, Chicago, Ill., assignor to Illinois Tool Works, Chicago, Ill., a corporation of Illinois Application January 30, 1942, Serial No. 428,807

12 Claims. (Cl. 24—221)

This invention relates generally to fastening devices and more particularly to fastening devices for detachably securing parts such as airplane cowlings and the like.

It is an object of the present invention to provide an improved fastening device of the type referred to above wherein a stud member carried by the detachable part may quickly and easily be detachably associated with respect to a resilient sheet metal locking device carried by another fixed part.

More particularly, the invention contemplates the provision of a fastening device wherein the sheet metal which receives the stud member is exceptionally sturdy in construction and yet sufficiently resilient to permit of efficient locking coaction with a rotary stud member. To this end it is proposed to provide a sheet metal fastening element having a base adapted to encircle the stud member and resilient cam means also adapted to encircle the stud member and spaced from said base, said stud encircling base and cam means cooperating to firmly and resiliently secure the stud member against unauthorized or inadvertent axial movement.

Still more specifically, the invention contemplates a fastening device wherein the aforesaid sheet metal part may be blanked from flat stock and subsequently folded so as to present the aforesaid stud encircling base and cam parts, said base and cam parts being circularly continuous so as to positively preclude spreading or lateral displacement when the rotary stud member is secured in position.

The foregoing and other objects and advantages will be more apparent from the following detailed description when considered in connection with the accompanying drawing wherein:

Fig. 1 is a side elevational view of the fastener device contemplated by the present invention shown in operative association with the work;

Fig. 2 is a vertical transverse sectional view taken substantially along the line 2—2 of Fig. 1;

Fig. 3 is a fragmentary perspective view of the two working pieces which are detachably secured together by the fastener of the present invention, said view being taken from the right side of Fig. 2;

Fig. 4 is a horizontal sectional view taken substantially along the line 4—4 of Fig. 3;

Fig. 5 is a view similar to Fig. 2 disclosing the cross pin of the stud member engaging the high point of the cam surface on the sheet metal locking device;

Fig. 6 is a perspective view of the sheet metal locking device and complementary stud member shown in detached relation;

Fig. 7 discloses a sheet metal blank which may be formed or bent to produce the device as shown in Fig. 6;

Fig. 8 is a fragmentary sectional view corresponding with the lower portion of the sectional view in Fig. 2 showing a slightly modified fastener construction; and Fig. 9 discloses an alternative form of sheet metal blank wherein abutment means in the form of lugs extend from the locking or stud engaging plate.

Referring now to the drawing more in detail wherein like numerals have been employed to designate similar parts throughout the various figures, it will be seen that a fastening device embodying the present invention is designated generally by the numeral 10. This device is preferably constructed of metallic sheet stock having firm resiliency. The device 10 includes a base section or plate 12 and a resilient locking or stud engaging section or plate 14 which completely superimposes or bridges the base plate. The locking plate 14 constitutes an integral extension of one margin of the base 12 and is connected to and maintained in spaced relation from the base plate 12 by a connecting or spacing section 16. The spacing section 16 extends out of the plane of the base plate 12 a sufficient distance to space the locking plate 14 from the base plate, as clearly illustrated.

The base plate 12 is provided with a central aperture 18 and the locking plate 14 is provided with a central aperture 20 for receiving a rotary stud 22. This stud is provided with a cross pin 24 which presents a pair of oppositely disposed lateral lugs for engaging complementary cam sections or surfaces 26 formed on the locking plate 14. Diametrically disposed radial recesses 28 in the locking plate 14 serve to accommodate the cross pin 24.

The margin of the locking plate 14 oppositely disposed from the margin thereof connected to the base plate 12 by the section 16 is formed with a laterally extending flange or spacing member 30. The free edge of this spacing member or flange 30 is adapted to impinge the adjacent margin of the base plate 12 when pressure is exerted upon the locking plate 14 through the coaction of the cam sections 26 and the complementary sections of the cross pin 24. Extending laterally and formed integral with the base plate 12 is a flange 32 which externally overlaps the flange 30 formed integral with the locking plate

14. The flange 32 cooperates with the flange 30 in positively preventing spreading of the fastening device when pressure is experienced by the locking plate. The flange 32 sufficiently overlaps the flange 30 to prevent separation or outward springing of the plate 14 from the plate 12.

Forming extensions of the base plate 12 and projecting beyond that portion of the base plate superimposed by the locking plate 14 is a pair of ears 34. These ears serve to facilitate fastening of the device 10 to the surface of a cowling part or the like, such as the sheet metal part designated by the numeral 36. Suitable fastening elements such as rivets 38 are accommodated by apertures 40 in the ears 34 and corresponding apertures in the cowling part 36. It will be noted that the work piece or cowling part 36 is also provided with an aperture 42 corresponding in size and registering with the aperture 18 in the base plate 12. To facilitate registration of the apertures 40 in the ears 34 with the complemental apertures in the cowling part 36, the material defining said apertures is preferably countersunk, as shown in Fig. 4. These complementary countersunk portions of the fastening device and work greatly facilitate the ease with which the parts may be initially associated before applying the rivets 38. In applications where it is desirable, a thin, soft aluminum base pad 44 is interposed between the cowling part 36 and the fastening device 10, as clearly illustrated in Fig. 4. The addition of this pad serves to insulate the cowl fastener from the surface of the work piece.

An annular abutment 46 encircles the aperture 18 of the base plate. This abutment 46 is extruded laterally from the material of the base plate, as clearly illustrated in Fig. 4. The abutment 46 serves the important function of preventing the yieldable locking section 14 from being stressed beyond a given limit when the lateral lugs 24 coact with the cam surfaces or means 26. Thus, when the stud is initially applied, the lugs 24 register with the radial recesses 28 and subsequent rotation of the stud causes the lugs 24 to move from the lowest point on the cam sections 26 toward the highest point. When the lugs reach the high point of the cams, as indicated in Fig. 5, the abutment 46 is engaged by the under side of the locking section and thus prevents further stressing of said section. As the stud continues its rotation, the lugs 24 are finally brought into registration with a complementary detent or depression 48. When the lugs 24 reach this position the previously stressed locking plate springs outwardly a sufficient distance to cause firm interlocking between the lugs and the indentations 48. This interlocking relation is illustrated in Figs. 1, 2 and 4. It will be noted that in this position the locking plate is still under considerable stress although slightly separated from the limiting abutment 46. The stud 22 is rotatably carried by a detachable work piece or cowling part 50 and may be rotated by the use of a suitable screw driver, in which instance the head of the stud is suitably slotted. In some instances it is desirable to employ a wing type head (not shown). The final positioning of the lugs 24 within the detents 48 serves to securely clamp the two work pieces 36 and 50 together. To detach the plate or work piece 50 from the fixed work piece 36, it is only necessary to impart reverse rotation to the lock stud 22, thereby causing the lugs 24 to again pass over the high point of the cams 26 and ultimately reach the complementary radial recesses 28.

In Fig. 9, a modified abutment means is disclosed in the form of lugs 51 extending from the locking plate 14. These lugs may be bent normal to the locking plate in position to engage the base plate 12 in the same manner that the annular abutment 46 extending from the base plate is engaged by the locking plate.

In instances where it is desirable to reduce the frictional resistance experienced by the lugs 24 during the initial rotation of the stud, a slightly modified fastening structure, as fragmentarily shown in Fig. 8, may be employed. Fig. 8 is a fragmentary sectional view similar to the sectional structure shown at the lower portion of Fig. 2. Attention is directed to a space 52 through which the flange 30 must move before engaging the base plate 12. By providing the space 52, frictional resistance during the initial rotation of the stud is materially reduced because the only resistance which must be overcome is that set up by the material of the hinge or connecting member 16. Of course, the flange 30 is moved into engagement with the base plate 12 before the parts are completely tightened so that the aforesaid firm yielding or stressing of the locking plate is brought into play in finally locking the parts in position.

It will also be noted from Fig. 7 that the above described fastening device may be formed from flat spring stock, it being only necessary to blank from sheet material the form shown in Fig. 7. Following the initial blanking operation, the cam surfaces and raised portions surrounding the apertures 40, as well as the annular abutment 46 defining the aperture 18, may be formed, and the sheet then folded or bent into the form disclosed in the other figures. In other words, the device of the present invention may be made by practicing conventional machine shop punch and die methods.

From the foregoing it will be apparent that the invention contemplates a fastening device of extremely simple and practical design which presents numerous structural and functional advantages over cowl fastening devices which have heretofore been employed commercially. In this connection, particular reference is again made to the novel arrangement of the base and locking plates. These plates are so disposed as to insure the desired firm locking resiliency and at the same time positively prevent spreading or distortion of the structure when used under the severest operating conditions. By employing the oppositely disposed spacing members as described, the entire body of the locking plate may be very effectively stressed for locking purposes. Having both the base plate and the locking plate disposed in encircling relation with respect to the stud member makes for durability and locking efficiency.

Obviously the specific structural details as hereinbefore described are merely representative of specific embodiments of the invention, and the invention is not in any sense limited to such structural details but is capable of other modifications and changes without departing from the spirit and scope of the appended claims.

The invention is hereby claimed as follows:

1. In a fastening device for detachably securing work surfaces together, said device comprising a single piece of sheet metal folded upon itself so as to present a base section for association with the surface of one work part and having a stud receiving aperture, a resilient section bridging said base section and spacing pieces extending between said sections to hold said sections in separated relation, said resilient section having a surface adapted to coact with a stud for causing the resilient section to be stressed when said parts are relatively rotated in a given direction to thereby resiliently clamp said work pieces together, and abutment means extending laterally from at least one of said sections into close proximity with respect to the other section for limiting the extent to which said resilient section may be abnormally stressed under the influence of said stud, said resilient section and said abutment being normally spaced from each other to insure resilient interlocking thereof in maintaining work surfaces clamped together.

2. A fastening device for detachably securing work surfaces together, comprising a base plate for association with the surface of one work part and adapted to accommodate a fastening stud, a resilient stud engaging plate superimposing the base plate, and plate spacing members along separated margins of said stud engaging plate, said base and stud engaging plates being adapted for telescopic association with said fastening stud, said stud engaging plate being relatively rotatable with respect to a companion stud and having a stud engaging surface for causing the stud engaging plate to be stressed laterally toward the base plate when the stud and stud engaging plate are relatively rotated in a given direction to thereby clamp said work surfaces together, the base plate presenting fastening tabs and the resilient stud engaging plate bridging the base plate between said tabs.

3. A fastening device as set forth in claim 1 wherein the base section constitutes a plate member.

4. A fastening device as set forth in claim 1 wherein the stud engaging section constitutes a plate member.

5. A fastening device for detachably securing work surfaces together, comprising a base plate for association with the surface of one work part adapted to accommodate a fastening stud, a resilient stud engaging plate superimposing the base plate, and plate spacing members along separated margins of said stud engaging plate, said base and stud engaging plates being adapted for telescopic association with said fastening stud, said stud engaging plate being relatively rotatable with respect to a companion stud and having a stud engaging surface for causing the stud engaging plate to be stressed laterally toward the base plate when the stud and stud engaging plate are relatively rotated in a given direction to thereby clamp said work surfaces together.

6. A fastening device as set forth in claim 5 wherein the stud engaging plate is marginally connected with said base by at least one of said spacing members.

7. A fastening device as set forth in claim 5 wherein the stud engaging plate includes an annularly continuous body portion.

8. A fastening device as set forth in claim 5 wherein the base plate includes an annularly continuous body portion.

9. A fastening device for detachably securing work surfaces together, comprising a base plate for association with the surface of one work part, a fastening stud adapted to be carried by another work part, said stud being equipped with a lateral lug, a resilient stud engaging plate superimposing the base plate, plate spacing members along spaced margins of said stud engaging plate, said base and stud engaging plates being adapted for telescopic association and relative rotation with respect to said stud, and a section on said stud engaging plate cooperating with said lateral lug of said stud to present cam and follower means for causing the stud engaging plate to be stressed laterally toward the base plate when the stud and stud engaging plate are relatively rotated in a given direction to thereby clamp said work surfaces together.

10. A fastening device for detachably securing work surfaces together, comprising a base plate adapted to be secured to the surface of one work part, a rotary fastening stud adapted to be carried by another work part, said stud being equipped with a lateral lug, a resilient stud engaging plate superimposing the base plate, plate spacing members along separated margins of said stud engaging plate, said base and stud engaging plates being adapted for telescopic association with said fastening stud, and a section on said stud engaging plate adapted to be engaged by the lateral lug of said stud so as to cause said stud engaging plate to be stressed laterally toward the base plate when the stud member is rotated in a given direction to thereby clamp said work surfaces together.

11. A fastening device formed from metallic sheet material comprising a base plate centrally apertured to receive and encircle a rotary fastening stud of the type equipped with a lateral lug, a stud locking section forming an integral extension of a margin of said plate, said locking section including a resilient locking plate superimposing said base plate and including an integral connecting and spacing member extending between adjacent margins of said plates, another spacing member extending between said plates in the vicinity of the opposite adjacent margins thereof, said locking plate being centrally apertured coaxially with respect to the aperture in the base plate and arranged to receive and encircle said stud, a section on said locking plate adapted to be engaged by the lateral lug of said stud so as to cause said locking plate to yield toward the base plate when said stud is rotated in a given direction, and means for securing said base plate in a fixed position upon the surface of a work piece.

12. A fastening device formed from metallic sheet material comprising a base plate centrally apertured to receive and encircle a rotary fastening stud of the type equipped with a lateral lug, a stud locking section forming an integral extension of a margin of said plate, said locking section including a resilient locking plate superimposing said base plate and including an integral connecting and spacing member extending between adjacent margins of said plates, another spacing member extending between and connected only to one of said plates in the vicinity of the opposite adjacent margins thereof, said locking plate being centrally apertured coaxially with respect to the aperture in the base plate and arranged to receive and encircle said stud, a section on said locking plate adapted to be engaged by the lateral lug of said stud so as to cause said locking plate to yield toward the base plate when said stud is rotated in a given direction, and means for securing said base plate in a fixed position upon the surface of a work piece.

OUGLJESA JULES POUPITCH.

CERTIFICATE OF CORRECTION.

Patent No. 2,324,268. July 13, 1943.

OUGLJESA JULES POUPITCH.

It is hereby certified that error appears in the printed specification of the above numbered patent requiring correction as follows: Page 3, first column, line 43, claim 5, after "part" insert --and--; and second column, line 26, claim 10, strike out "member"; and that the said Letters Patent should be read with this correction therein that the same may conform to the record of the case in the Patent Office.

Signed and sealed this 7th day of December, A. D. 1943.

(Seal)

Henry Van Arsdale,
Acting Commissioner of Patents.